United States Patent [19]

Haberkorn

[11] Patent Number: 4,974,399
[45] Date of Patent: Dec. 4, 1990

[54] MOWER HAVING A FRAME FORMING A DEFORMABLE QUADRILATERAL

[75] Inventor: M. Jean-Paul Haberkorn, Saverne, France

[73] Assignee: Kuhn S.A., Saverne, France

[21] Appl. No.: 388,810

[22] Filed: Aug. 3, 1989

[30] Foreign Application Priority Data

Aug. 18, 1988 [FR] France ................................. 8811105

[51] Int. Cl.$^5$ ........................................... A01D 34/66
[52] U.S. Cl. ......................................... 56/6; 56/15.2; 56/15.5; 56/255
[58] Field of Search .................. 56/6, 13.6, 15.1, 15.2, 56/15.5, 228, 255

[56] References Cited

U.S. PATENT DOCUMENTS

| | | | |
|---|---|---|---|
| 3,023,561 | 3/1962 | Gustafson | 56/13.6 |
| 3,783,533 | 1/1974 | Konig | 56/6 |
| 4,723,396 | 2/1988 | Ermacora | 56/13.6 |
| 4,733,525 | 3/1988 | Pellec et al. | 56/255 |
| 4,848,069 | 7/1989 | Ermacora et al. | 56/15.8 |

FOREIGN PATENT DOCUMENTS

| | | |
|---|---|---|
| 2524348 | 12/1976 | Fed. Rep. of Germany . |
| 2255839 | 7/1975 | France . |
| 2302011 | 9/1976 | France . |
| 2557418 | 7/1985 | France . |
| 2584889 | 1/1987 | France . |
| 1225319 | 3/1971 | United Kingdom . |

Primary Examiner—George A. Suchfield
Attorney, Agent, or Firm—Oblon, Spivak, McClelland, Maier & Neustadt

[57] ABSTRACT

Hinged connection (16) forms a connection element (17) connected to hitching element (9) by a first joint (20) and to support beam (14) by a second joint (21). Connection element (15) and connection element (17) form with hitching element (9) and support beam (14) a deformable quadrilateral (22) making it possible, for transport, to move the mowing group (2) toward median vertical plane (62) of the tractor (8).

35 Claims, 6 Drawing Sheets

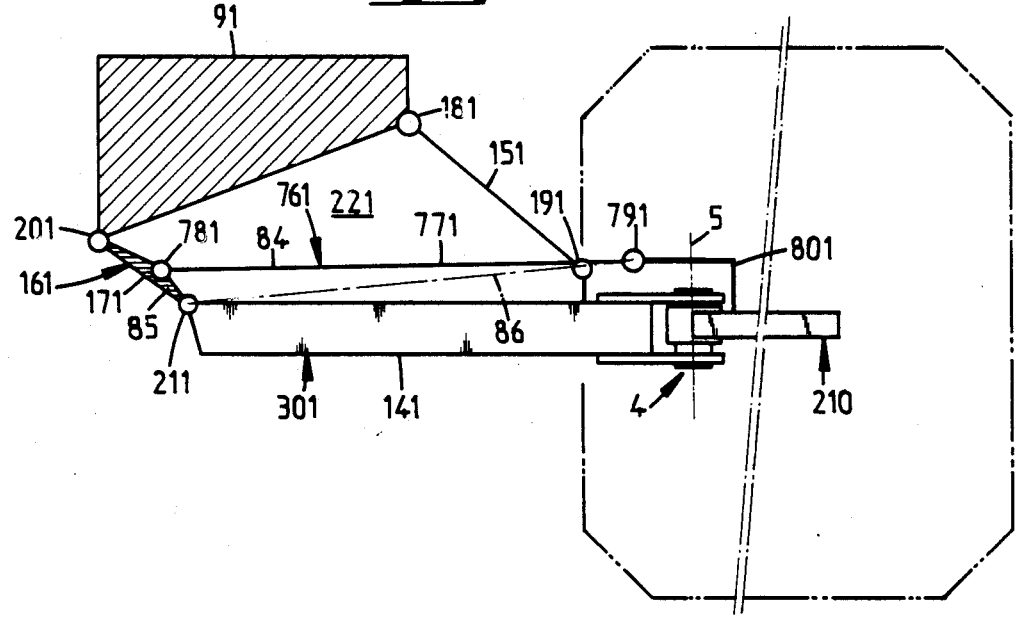
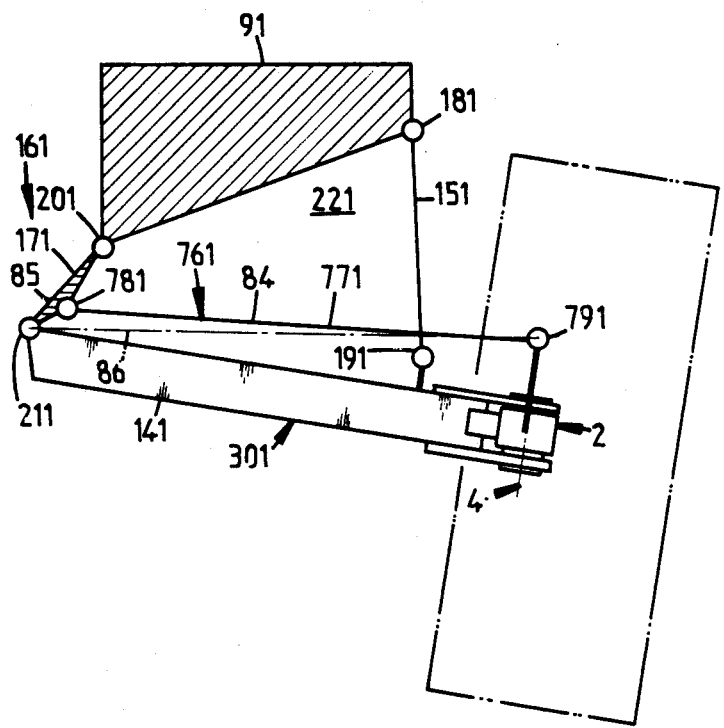

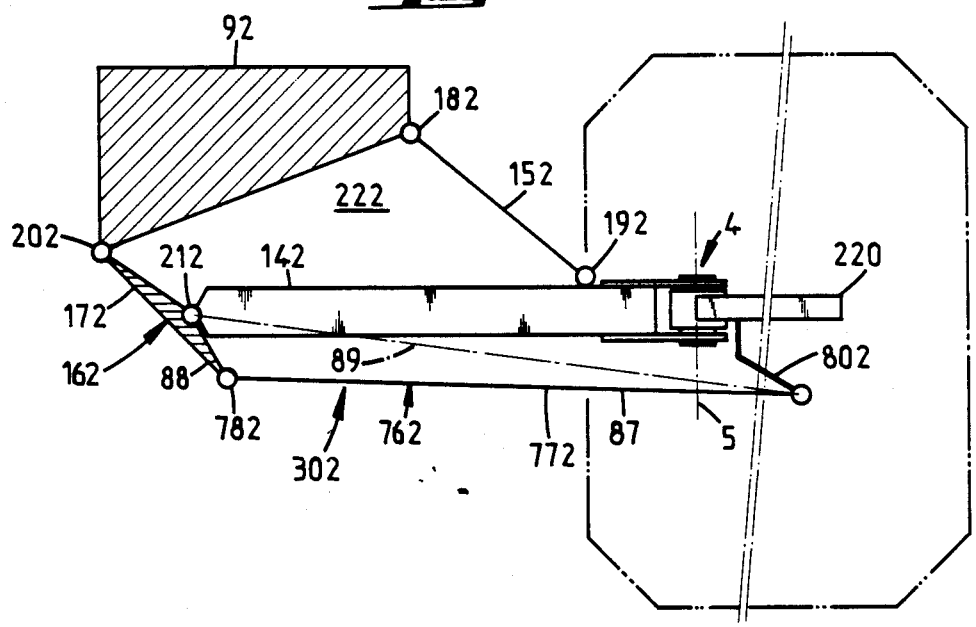
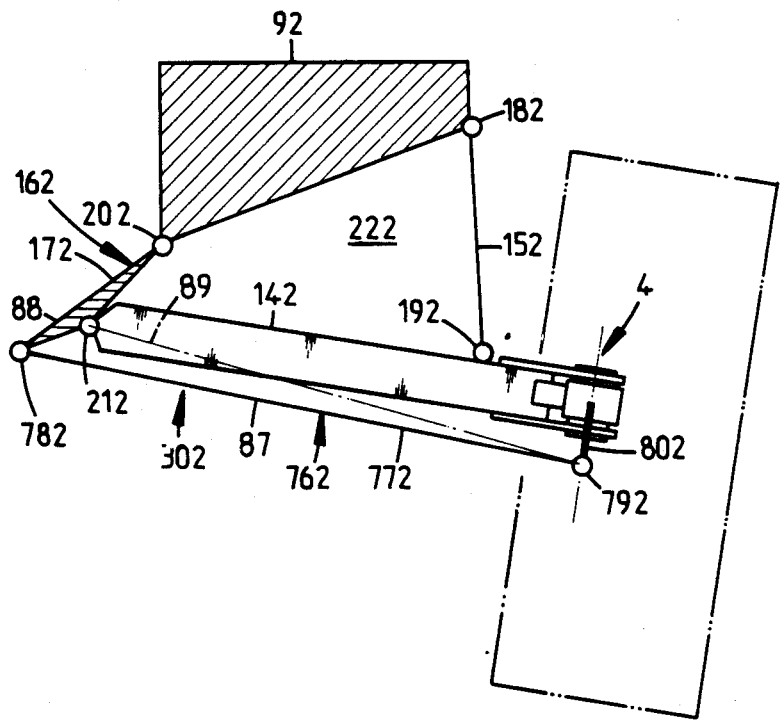

MOWER HAVING A FRAME FORMING A DEFORMABLE QUADRILATERAL

BACKGROUND OF THE INVENTION

1. Field of the Invention

This invention relates to a mower comprising a frame and a mowing group connected to said frame by a joint with a geometric axis directed at least approximately in the direction of advance at work, said frame comprising, on the one hand, a hitching element making it possible to hitch the mower to a tractor so that at work, the mowing group extends laterally on the side of the path of said tractor and, on the other hand, a support beam to whose outside end the mowing group is connected by the joint with a geometric axis directed approximately in the direction of advance at work, said support beam being connected to said hitching element by a hinged connection and a first connection element itself connected to the hitching element by a first joint and to the support beam by a second joint with a geometric axis approximately parallel to the geometric axis of the first joint, said mowing group being able, by pivoting around the joint with a geometric axis directed approximately in the direction of advance at work, to be brought to a transport position in which the mowing group is directed upward.

2. Background of the Related Art

Such a mower is described in FR-A-No. 2 240 679. In this known mower, the mowing group comprises a cutting bar equipped with four disks turning around axes directed upward. This known mower further comprises a frame making it possible to hitch it to a tractor. The mowing group is connected to this frame by a joint with an axis directed in the direction of advance. For this purpose, the frame is equipped with a yoke while the mowing group is equipped with a support element in the form of a transmission housing and able to pivot in the yoke around the axis directed approximately in the direction of advance.

The frame comprises a support beam and a hitching element. The mower is hitched by the latter to a tractor. This support beam is connected to the hitching element by a hinged connection and a first connection element. The hinged connection by which the support beam is connected to the hitching element consists of a simple joint with a vertical axis. The first connection element is formed by a safety tie rod whose length may be increased by pulling at its two ends. In this manner, the mowing group, in case it should hook an obstacle, can move together with the support beam relative to the hitching element by pivoting around the vertical axis of the hinged connection connecting the support beam to the hitching element.

In this known mower, the axis of the joint, by which the mowing group is connected to the support beam, extends by a certain distance outside the space requirement of the tractor. In addition, this axis extends by a certain distance from the ground. Thus, when the mowing group is brought by pivoting around this axis to its transport position, in which it extends upward, said mowing group exceeds by a not inconsiderable distance the space requirement of the tractor. This is disadvantageous in several respects as will be described later.

In FR-A-No. 2 255 839, another mower is described. In this known mower, the mowing group comprises a cutting bar equipped with six disks turning around axes directed upward. The disks extending to each end of the cutting bar are surmounted by a drum. This known mower further comprises a frame making it possible to hitch it to a tractor. The mowing group is connected to this frame by a joint with an axis directed approximately in the direction of advance, and extending by a certain distance outside the space requirement of the tractor. For this purpose, the frame is equipped with a yoke to which is connected in a hinged manner a support element forming part of the mowing group. This support element comprises a foot extending approximately horizontally to the back end of which is attached a leg extending approximately vertically. The foot is attached by its front end to the cutting bar and the leg is connected at its upper end to the frame by the joint with an axis directed approximately in the direction of advance. This support element extends in top view entirely behind the first disk. The disks and the drums of this known mower are driven in rotation by a drive shaft going through the drum surmounting the first disk. This drive shaft comprises two parts connected to each other by a flexible coupling. At its lower part, the drive shaft is connected in rotation, on the one hand, to the first disk and to the drum surmounting the latter and, on the other hand, to a cylindrical gear housed in a housing of the cutting bar. This cylindrical gear transmits the movement to a cascade of other cylindrical gears also housed in the housing of the cutting bar in order to assure the driving in rotation of the other disks and the other drum. The drive shaft itself is driven in rotation by an input shaft whose rotational axis is merged with the axis of the joint connecting the mowing group to the frame and by a pair of bevel gears extending to the vertex of the drive shaft and connecting it in rotation to said input shaft. This input shaft is driven in rotation by the power takeoff of the tractor by a device with a cardan shaft and belt pulleys. This known mower also comprises a hydraulic cylinder attached between the frame and the mowing group to bring the mowing group by pivoting around the joint to a transport position in which the mowing group extends upward.

This known mower exhibits the feature of having a mowing group whose overall width at ground level is equal to the cutting width. This is advantageous in several respects.

During the first passage, the mowing group does not bend the product to be harvested without cutting it. Further, during subsequent passages, it is not necessary to clear strips of ground wider than those necessary for the wheels of the tractor extending near the cutting bar. Since there is no part of the mowing group which exceeds, at ground level, the width of the cutting, risks of packing due to hooking of cut product to such a part are eliminated.

In transport, this known mower exhibits, however, the drawback of widely exceeding the overall width of the tractor. This is due to the fact that the axis of the joint connecting the mowing group to the frame extends above the drum surmounting the first disk, i.e. at a relatively significant height relative to the ground and, moreover, clearly outside the space requirement of the tractor. Thus, when the mowing group is pivoted in its transport position in which it extends approximately vertically, the mowing group extends laterally beyond the joint a distance equal to the value of said height.

In these known mowers, the overall width of the tractor-mower unit therefore is relatively great in transport. This can pose some problems for passing on narrow roads or through some farm entrance gates. This also poses visibility problems during driving. Since the center of gravity of the mowing group is relatively offset laterally, the frame of the mower and the hitching device of the tractor are stressed substantially. In addition, the wheels of the tractor extending on the side opposite to that where the mowing group extends are lightened substantially, which can pose problems of stability for low-power tractors.

SUMMARY OF THE INVENTION

An object of this invention is to solve the above problems.

The above, and other objects are accomplished according to the present invention by a mower to be connected to a tractor having a median vertical plane extending at least approximately in a direction of advance at work, said mower comprising a frame connectable to a tractor and a mowing group connected to the frame by a pivot joint having an axis extending at least approximately parallel to the direction of advance at work, whereby the mowing group may be positionned in a working position laterally of the tractor and may be pivoted to an upwardly directed transport position. The frame comprises a deformable quadrilateral permitting for transport to move said mowing group towards said median vertical plane, said quadrilateral including a hitching element constituting one leg of the quadrilateral, the hitching element comprising means for connecting the frame to the tractor. The frame further comprises a support beam constituting another leg of the quadrilateral, said mowing group being pivotally connected to said support beam by said pivot joint. The frame further comprises first and second connection elements pivotally connected between the hitching element and the support beam by pivot joints having at least approximately parallel axes, the first and second connection elements being spaced from one another.

Therefore, the mowing group, for transport, can be moved toward the median vertical plane of the tractor. The overall width of the tractor-mower unit is thereby smaller. Further, the center of gravity of the mowing group is moved closer to the median vertical plane of the tractor, which stresses the frame of the mower and the hitching device of the tractor less and lightens less the wheels of the tractor extending on the side opposite to that where the mowing group extends.

A relatively significant movement can be obtained when in work position, the connection elements are inclined in the direction of the side where the mowing group extends.

According to a particularly advantageous embodiment, it is provided that the quadrilateral formed by the first connection element, the second connection element, the hitching element and the support beam is deformable in an at least approximately horizontal plane.

Preferably, one of the connection elements will be made in link form, while the other connection element constitutes the support element by which the hitching element supports the support beam and the mowing group.

When the connection element constituting the support element is arranged at the end of the support beam distant from the mowing group, and when the other connection element extends between said support element and the end of the support beam where the mowing group is connected, it will be easy to make this other connection element in the form of a safety tie rod whose length can be increased by an axial pull. Thus, when the mowing group accidentally hooks an obstacle during work, said mowing group and the support beam exert a pull on the safety tie rod which lengthens when the release threshold is attained. At this moment, the mowing group-support beam unit will be able to move away from the hitching element by pivoting around the joints of the second connection element, thus avoiding damaging the mowing group.

According to an additional characteristic of the invention, it is provided that the length of the connection element extending closest to the mowing group is greater than the length of the other connection element, and that in work position, said connection element extending nearest to the mowing group is greatly inclined in the direction on the side where the mowing group extends.

This characteristic is particularly advantageous when the mowing group is equipped with a guard. Such a guard is actually necessary when the mowing group runs the risk of throwing rocks, for example. This guard, to meet current standards, generally has relatively large dimensions, so that when putting of the mowing group into transport position, problems of interference with the wheels of the tractor would arise. But these problems are now eliminated by the fact that during moving the mowing group in the direction of the median vertical plane of the tractor for transport, said mowing group also is sufficiently separated from the tractor so that the guard can extend at least partially in the track of the wheel of the tractor extending in the vicinity of the mowing group.

To simplify putting the mower into transport position even further, control means are provided in the invention for acting directly or indirectly on the deformable quadilateral and causing the movement of the mowing group toward the median vertical plane of the tractor simultaneously with the pivoting of the mowing group in its transport position.

According to an additional characteristic of the invention, it is provided that putting the mowing group into transport position is achieved, in a known manner in the art, by a maneuvering element connected at one of its ends to the frame and at the other of its ends to the mowing group.

According to another additional characteristic of the invention, it is also provided that a lightening element, connected directly or indirectly to the hitching element of the frame, lightens the mowing group.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 shows a diagrammatic top view of a second embodiment of the invention, the mowing group being in the work position, FIG. 7 shows a diagrammatic top view of the second embodiment, the mowing group being in the transport position, FIG. 8 shows a diagrammatic top view of a third embodiment of the invention, the mowing group being in the work position, and FIG. 9 shows a diagrammatic top view of the third embodiment, the mowing group being in the transport position.

DETAILED DESCRIPTION OF THE PREFERRED EMBODIMENTS

Figure 1:
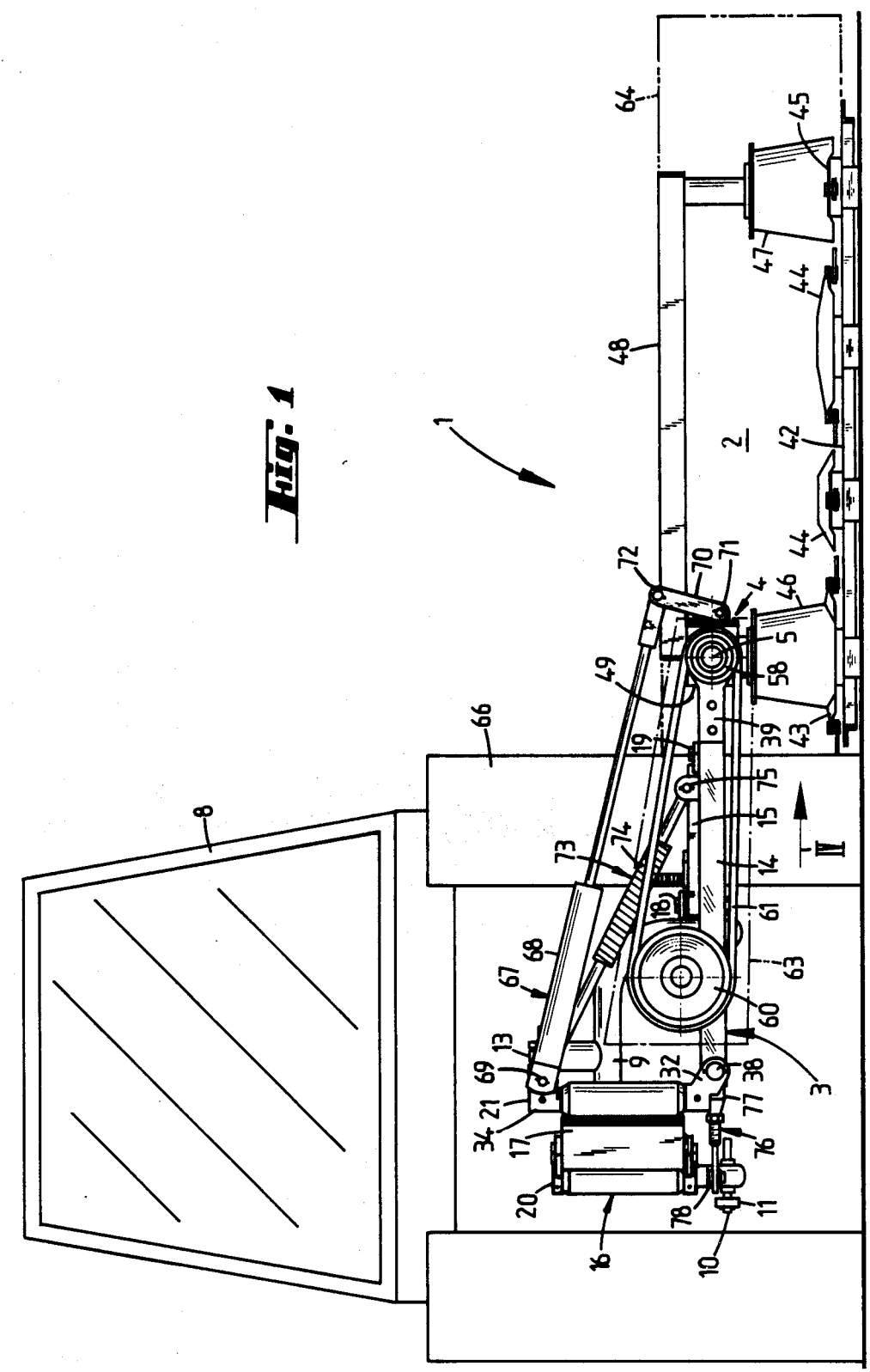
FIG. 1 shows, in work position, a mower according to the invention seen from behind in the direction of at work and hitched to a tractor.

Mower (1), as shown in FIGS. 1 to 5, comprises a mowing group (2) and a frame (3). Mowing group (2) is connected to frame (3) by a pivot joint (4) with geometric axis (5) directed approximately in the direction of advance (6) during work, i.e., parallel to the median axis (62) of the tractor.

At work, mower (1) is hitched to hitching device (7) of a tractor (8) so that mowing group (2) extends, as seen in the direction of advance (6) during work, laterally on the side of the path of said tractor (8) and crosswise to the direction of advance (6) during work. For this purpose, frame (3) is equipped with hitching element (9) intended to be coupled to hitching device (7) of tractor (8). This hitching element (9) comprises two lower hitching points (10) suited for being connected to two lower arms (11) of hitching device (7) and an upper hitching point (12) suited for being connected to upper link (13) of said hitching device (7).

Frame (3) further comprises a support beam (14) connected to hitching element (9) by a first connection element (15) and a hinged connection (16). This hinged connection (16) includes according to the invention, a second connection element (17). First connection element (15) is connected to hitching element (9) by a first joint (18) and to support beam (14) by a second joint (19). Second connection element (17) is also connected to hitching element (9) by a first cylindrical joint (20) and to support beam (14) by a second cylindrical joint (21). Joints (18, 19, 20, 21) have geometric axes which are approximately parallel to each other and which extend approximately vertically. In this manner, first connection element (15), second connection element (17), hitching element (9) and support beam (14) form quadrilateral (22) which is deformable in an approximately horizontal plane.

Figure 5:
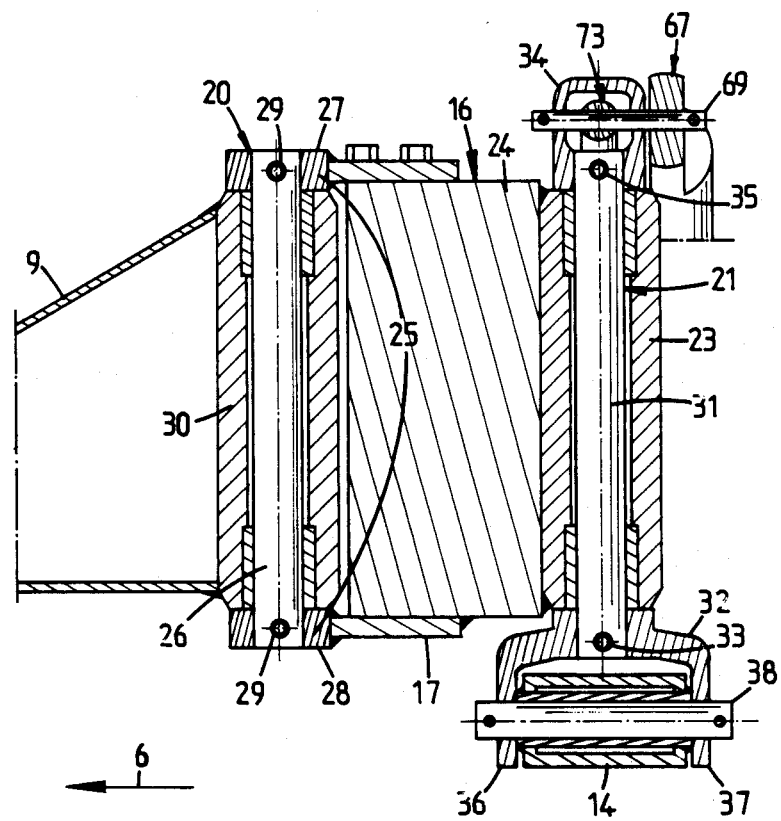
FIG. 5 shows, on an enlarged scale, a view in section of the hinged connection connecting the support beam of the mower of FIGS. 1 to 4 to the hitching element, the section being made along the plane of vertical symmetry of the second connection element while this second connection element is, in top view, perpendicular to the longitudinal axis of the support beam.
Figure 4:
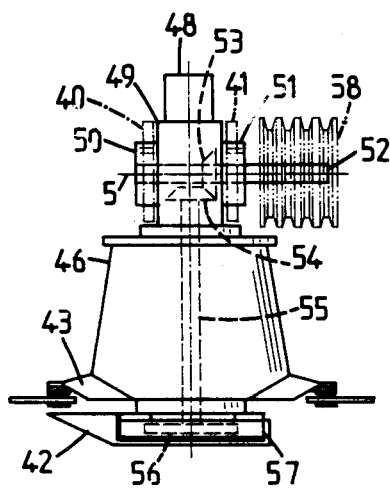

Hinged connection (16), which is arranged at the end of support beam (14) away from mowing group (2) is shown in more detail in FIG. 5. Second connection element (17) includes a tubular element (23) and a support arm (24) which is welded to this tubular element (23). At its end opposite tubular element (23), second connection element (17) comprises a yoke (25) which supports a pin (26). This pin (26) is connected to two wings (27, 28) of yoke (25) by pins (29). Said pin (26) is guided in rotation in a tubular element (30) integral with hitching element (9). This tubular element (30) and this pin (26) constitute the first cylindrical joint (20).

In tubular element (23), is guided in rotation a pin (31) in rotation which is connected at its lower end protruding from tubular element (23) to a yoke (32) by a pin (33) and is connected at its upper end protruding from tubular element (23) to hooking element (34) by a pin (35). Tubular element (23) and pin (31) constitute second cylindrical joint (21). Between the two wings (36, 37) of yoke (32) is pivoted the end of support beam (14) away from mowing group (2). Support beam (14) is connected to this yoke (32) by a pin (38) whose geometric axis is directed approximately in the direction of advance (6) during work. Support beam (14) thus is capable of pivoting vertically, which contributes to a good adaptation of mowing group (2) to the configuration of the land to be mowed. For this purpose, joints (18, 19) connecting first connection element (15) to hitching element (9) and to support beam (14) respectively are spherical joints or optionally cylindrical joints with play. In FIG. 5, it thus clearly comes out that second connection element (17) constitutes the support element by which hitching element (9) supports support beam (14).

At its end located in the vicinity of mowing group (2), support beam (14) is connected to this mowing group (2) by joint (4) with geometric axis (5) directed approximately in the direction of advance (6) during work.

First connection element (15), in the form of a link, is arranged between second connection element (17) and the end of support beam (14) where mowing group (2) is connected. Advantageously, the link forming first connection element (15) consists of a safety tie rod whose length can be increased by a pull exerted at its ends. Such a safety tie rod is known to one skilled in the art and therefore will not be described in more detail. Thanks to this safety tie rod, mowing group (2) can move relative to hitching element (9) in case it hooks an obstacle during work. Damaging mower (1) thus is avoided.

It is further shown that the length of this first connection element (15) is greater than the length of second connection element (17) and that in work position, this first connection element (15) is greatly inclined in the direction of the side where mowing group (2) extends. Second connection element (17) is also inclined in the direction of the side where mowing group (2) extends.

As stated above, mowing group (2) is connected to support beam (14) by joint (4) with geometric axis (5) directed approximately in the direction of advance (6) during work. For this purpose, support beam (14) is equipped with a yoke (39) in whose wings (40, 41) mowing group (2) can pivot in a manner which will be described below.

Mowing group (2) comprises a cutting bar (42) equipped with cutting elements (43, 44, 45). In the example shown, these cutting elements (43, 44, 45) consist of disks equipped on their periphery with cutting tools and turning around geometric axes directed upward. Cutting elements (43, 45), each extending at one end of cutting bar (42), are each surmounted by a drum (46, 47) which turns around the same geometric axis as the cutting element (43, 45) that it surmounts.

Mowing group (2) further comprises a carrying structure (48) which supports cutting bar (42) through drums (46, 47) in a manner which will not be described in detail since it is known to those skilled in the art. Above drum (46) surmounting cutting element (43) which extends closest to frame (3), carrying structure (48) is equipped with a transmission housing (49). This transmission housing (49) performs a double function. First of all, it is a link by which mowing group (2) is connected to support beam (14). It also contains a part of the driving elements driving cutting elements (43, 44, 45) and drums (46, 47). This is shown in a detailed manner in FIG. 4.

First of all, transmission housing (49) has two cylindrical bearing surfaces (50, 51) able to turn in wings (40, 41) (shown by dot-and-dash lines in FIG. (4)) of yoke (39) of support beam (14). These cylindrical bearing surfaces (50, 51), and wings (40, 41) of yoke (39), thus constitute joint (4). The cylindrical bearing surfaces (50, 51) are of a type known to one skilled in the art, made in the form of a bearing within which an input shaft (52), whose rotation axis is coaxial with geometric axis (5) of joint (4), is guided in rotation. Inside transmission housing (49), input shaft (52) is connected in rotation to a bevel gear (53) which engages with a bevel gear (54). This latter bevel gear (54) is connected in rotation to the upper end of a drive shaft (55) whose rotation axis is coaxial with the rotation axis of cutting element (43) and drum (46) surmounting cutting element (43). Drive shaft (55) extends through drum (46) and cutting element (43). At its lower end, it is connected to additional drive elements (56) known to one skilled in the art and extending inside a housing (57) comprised by cutting bar (42).

These additional drive elements (56) can, for example, be cylindrical gears engaging with one another.

At its rear, input shaft (52) extends out of transmission housing (49) and is connected for rotation with a pulley (58). This pulley (58) forms part of the transmission elements of mower (1) which transmit the movement from the power takeoff (not shown) of tractor (8) to the drive elements of mowing group (2). These transmission elements further comprise a transmission shaft with universal joints (59), a pulley (60) and an endless transmission element (61). Transmission shaft (59) is connected in rotation to pulley (60) attached to support beam (14) and having a rotation axis directed approximately in the direction of advance (6) during work. In the work position, this pulley (60) is offset relative to median vertical plane (62) of tractor (8) in the direction of mowing group (2). The transmission of the movement of pulley (60) to pulley (58) is provided by the endless transmission element (61) which winds on said pulleys (58, 60). A protective hood (63) (shown by dot-and-dash lines) partially surrounds pulleys (58, 60) and endless transmission element (61).

Figure 2:
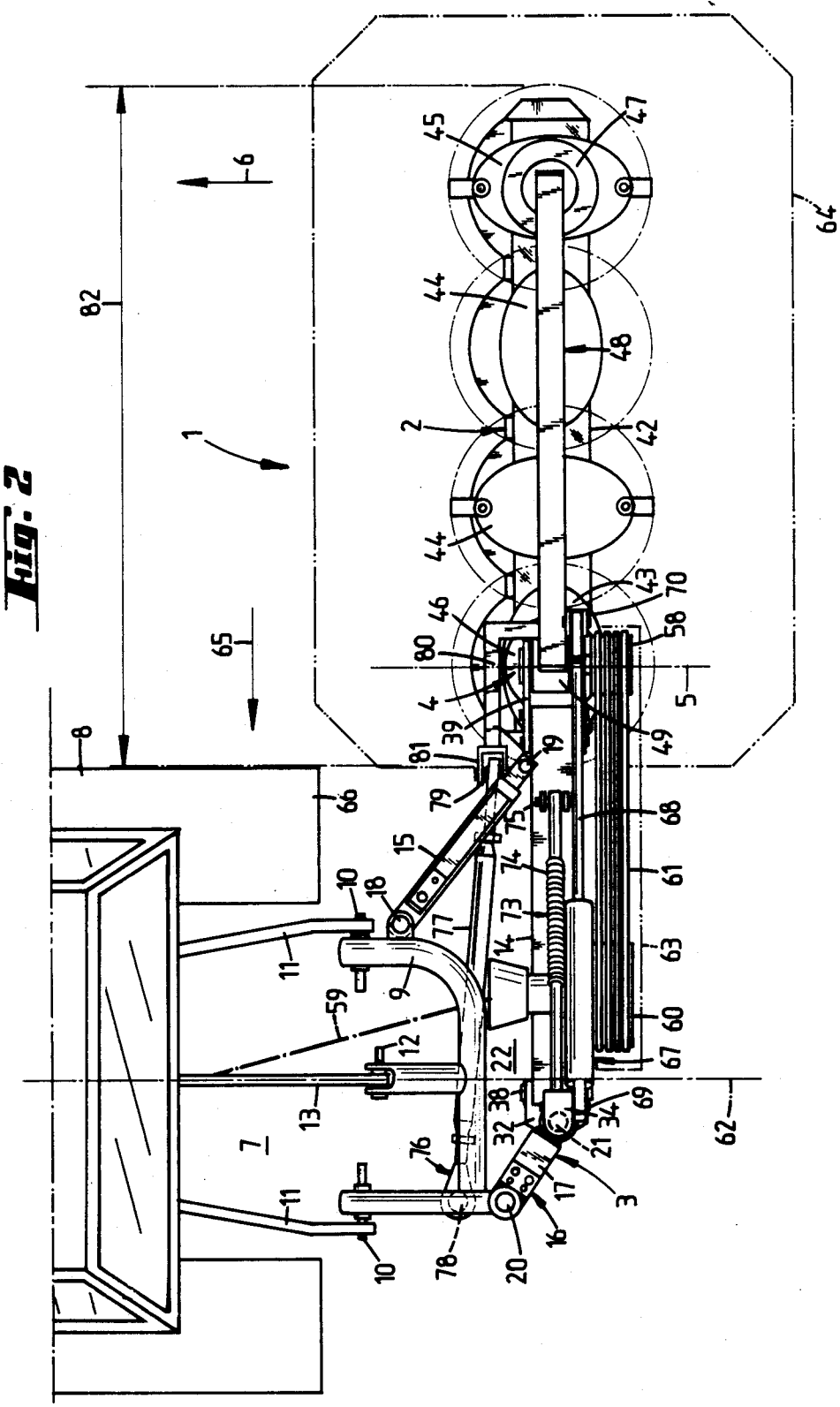
FIG. 2 shows a top view of the mower of FIG. 1 while still in position.

Mowing group (2) is equipped with a protective device (64) (also shown by dot-and-dash lines) which surrounds cutting elements (43, 44, 45). As can be seen in FIG. 2, this protective device (64) extends, seen according to arrow (65), laterally to the level of the rear part of wheel (66) of tractor (8) closest to mowing group (2).

Mower (1) further comprises a maneuvering element (67) which makes it possible to pivot mowing group (2) to its transport position in which it extends upward. In the embodiment, this maneuvering element (67) is a hydraulic cylinder (68). This hydraulic cylinder (68) is connected at one of its ends to hooking element (34) by a pin (69) and at the other of its ends to mowing group (2) by a pivoting lever (70). This pivoting lever (70) is connected to mowing group (2) by a pine (71) and to hydraulic cylinder (68) by a pin (72).

Mower (1) also comprises a lightening element (73) which serves to lighten mowing group (2). In the embodiment, this lightening element (73) is a draw spring (74). This draw spring (74) is connected at one of its ends to hooking element (34) by pin (69) and at the other of its ends to support beam (14) by a pin (75). Draw spring (74) thus exerts a torque on support beam (14) around pin (38) which connects said support beam (14) to yoke (32). The torque is directed in a direction so that it creates at the level of yoke (39) of support beam (14) a force directed upward.

Figure 3:
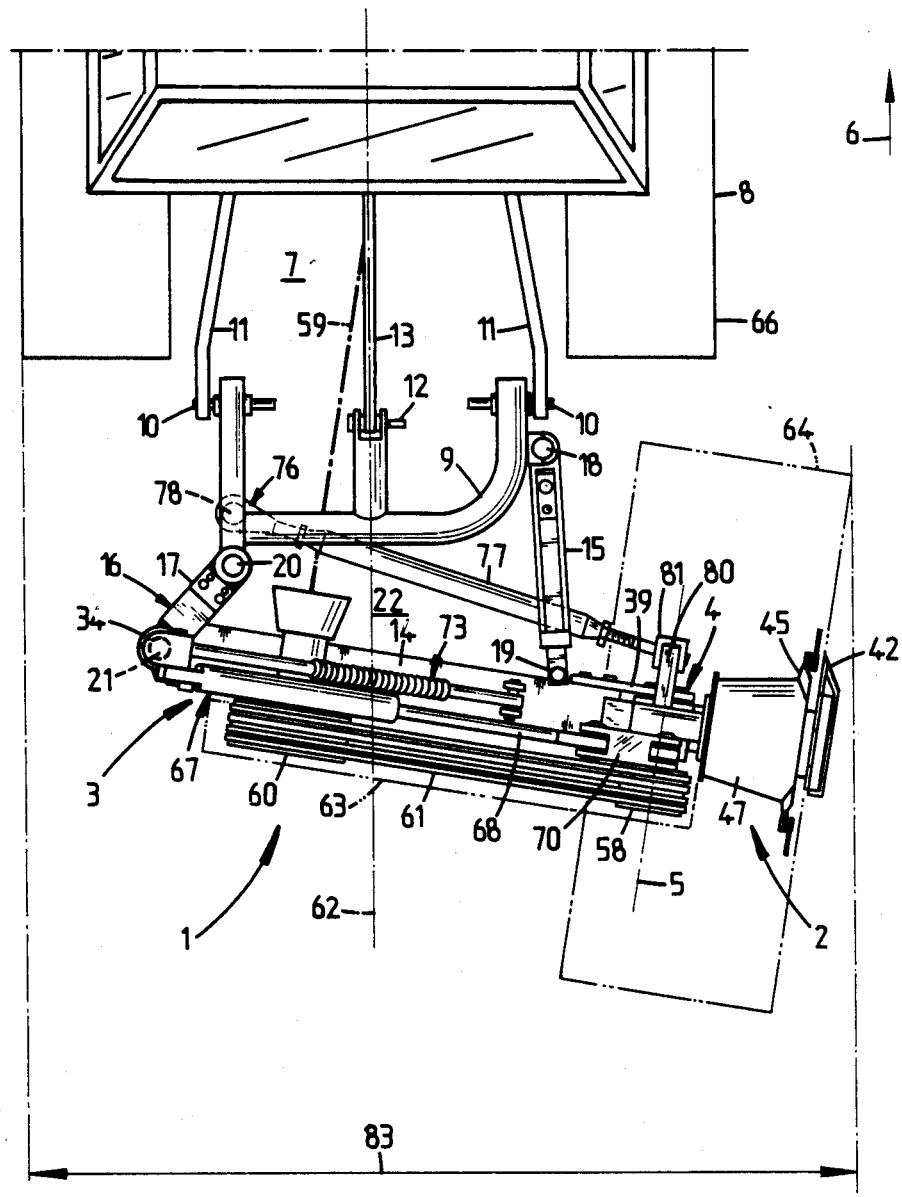
FIG. 3 shows a top view of the mower of FIGS. 1 and 2 in a transport position, FIG, 4 shows, on an enlarged scale, a view according to arrow IV of FIG. 1, of the mowing group of the mower FIGS. 1 to 3.

Mower (1) finally also comprises control means (76) which acts on deformable quadrilateral (22). In the embodiment shown in FIGS. 1 to 3, this control means (76) consists of a control element (77) (a bar in the example shown) connected at one of its ends to hitching element (9) by a first spherical joint (78) and at the other of its ends to mowing group (2) by a second spherical joint (79). This second joint (79) is arranged in respect to geometric axis (5) of joint (4), so that it pulls on control element (77), when mowing group (2) is pivoted to its transport position (FIG. 3). For this purpose, mowing group (2) comprises an arm (80) which is equipped at its free end with a yoke (81) to which control element (77) is connected by joint (79). In FIG. 1, it is seen that in a normal work position, control element (77) extends approximately horizontally so that joints (78, 79) extend in an approximately horizontal plane.

Mower (1) of FIGS. 1 to 5, which has just been described, operates in the following manner.

The mower is hitched to hitching device (7) of a tractor (8) by its hitching element (9) and the transmission shaft with universal joints (59) is coupled to the power takeoff (not shown) of said tractor (8).

During work, mowing group (2) extends in its work position as shown in FIGS. 1 and 2. Tractor (8) moves mower (1) in the direction of advance (6) during work and its power takeoff drives in rotation cutting elements (43, 44, 45) and drums (46, 47) by transmission elements (59, 60, 51, 68) and various drive elements (52, 53, 54, 55, 56).

By turning, cutting elements (43, 44, 45) cut the product to be harvested which is in cutting zone (82) and drums (46, 47) calibrate the windrow of the cut product laid down behind mowing group (2), while avoiding the hooking of cut product onto drive shaft (55) as well as onto, the part of carrying structure (48) extending inside drums (46, 47).

Since support beam (14) can pivot somewhat around pin (38) and mowing group (2) can pivot relative to support beam (14), said mowing group (2) can indeed follow the configuration of the land to be mowed. Lightening element (73) reduces the force with which mowing group (2) rests on the ground.

To put mower (1) in transport position (FIG. 3), hitching device (7) of tractor (8) is operated first, which has the effect of lifting the mower when the pivoting of support beam (14) around pin (38) stops. Maneuvering element (67) then is operated (i.e. the cylinder (68) is contracted), which causes the pivoting of mowing group (2) upward around joint (4). The transport position is reached when mowing group (2) occupies approximately a vertical position When mowing group (2) pivots upwardly around geometric axis (5) of joint (4) during the movement to reach the transport position, it pulls, via arm (80), on control element (77) since the second joint (79) is then caused to pivot downwardly around geometric axis (5) of joint (4). Since control element (77) is connected to hitching element (9) and its length is fixed, this has the effect of deforming deformable quadrilateral (22) so that support beam (14) and mowing group (2) move towards median vertical plane, (62) of tractor (8). Overall width (83) of the tractor (8) - mower (1) unit this is reduced. The deformation of deformable quadrilateral (22) will be stopped when the pivoting of mowing group (2) upward is stopped. The shape of quadrilateral (22) then will be maintained in this position by control element (77).

In addition, since first connection element (15) is longer than second connection element (17) and in work position it is greatly inclined in the direction of the side where mowing group (2) extends, mowing group (2) moves away from wheel (66) of tractor (8) during the pivoting of mowing group (2) in transport position, so that protective device (64) can extend at least partially in the track of this wheel (66).

To bring mowing group (2) to work position, it will be sufficient to make said mowing group (2) pivot downward around joint (4). When doing this, mowing group (2) pushes on control element (77) via arm (80). Since the control element (77) is connected to hitching element (9) and since its length is fixed, this will have the result of deforming deformable quadrilateral (22) in a direction such that support beam (14) and mowing group (2) move away from median vertical plane (62) of tractor (8). The deformation of deformable quadrilateral (22) will be stopped when mowing group (2) reaches its work position.

The shape of quadrilateral (22) will be maintained in this position by control element (77) when mowing group (2) is not pivoting around geometric axis (5). Such pivoting, however, occurs when mowing group (2) adapts to the configuration of the ground. In the work position, however, it will be noted that the deformation of deformable quadrilateral (22) is minimal when mowing group (2) pivots somewhat around geometric axis (5) to adapt to the configuration of the ground, because in normal work position joints (78 and 79) connecting control element (77) to hitching element (9) and to arm (80) of mowing group (2) respectively, extend in an approximately horizontal plane.

In FIGS. 6 and 7, a second embodiment is shown. Support beam (141) is connected to hitching element (91) by two connection elements (151, 171). First connection element (151) is connected to hitching element (91) and to support beam (141) by joints (181) and (191), respectively. Second connection element (171) is connected to hitching element (91) and to support beam (!41) by joints (201) and (211), respectively. Mowing group (210) is connected to the free end of support beam (141). The mowing group (210) is equipped with an arm (801) to which control element (771) is connected by joint (791). The main difference between this embodiment and the preceding embodiment besides in the fact that this control element (771) is connected at its other end to a pivoting element by joint (781) and is no longer directly connected to the hitching element. The advantage of such an arrangement resides in the fact that joint (791) by which control element (771) is connected to mowing group (210) can then extend, while obtaining an identical movement of the mowing group, closer to geometric axis (5) of joint (4) connecting mowing group (210) to support beam (141).

In the example shown, the pivoting element is advantageously made by one of the connection elements, in this case second connection element (171) extending at the end of support beam (141) away from mowing group (210). Joint (781) connecting control element (771) to second connection element (171) extends between joints (201, 211) connecting said second connection element (171) to hitching element (91) and to support beam (141), respectively. Joints (211, 781, 791) thus form a triangle whose side (84) connecting joints (781 and 791) as well as side (85) connecting joints (781 and 211), has a fixed length. Side (86) connecting joints (211 and 791), on the other hand, has a variable length. Joint (791) is arranged on mowing group (210) so that when the latter is pivoted to its transport position, the length of side (86) connecting joints (211 and 791) increases. Since the two other sides (84 and 85) of the triangle have fixed lengths, this produces an increase of the angle between these two sides (84 and 85) and consequently by a deformation of deformable quadrilateral (221) in a direction such that mowing group (210) draws near to the median vertical plane of the tractor.

A third embodiment is shown in FIGS. 8 and 9. Support beam (142) is connected to hitching element (92) by two connection elements (152, 172). First connection element (152) is connected to hitching element (92) and to support beam (142) by joints (182) and (192), respectively. Second connection element (172) is connected to hitching element (92) and to support beam (142) by joints (202) and (212), respectively. Mowing group (220) is connected to the free end of support beam (142). The mowing group is equipped with an arm (802) to which control element (772) is connected by joint (792). This control element (772) is connected at its other end to second connection element (172) (pivoting element) by joint (782). In this example, joint (782) connecting control element (772) to second connection element (172) extends beyond joint (212) connecting said second connection element (172) to support beam (142). Joints (212, 782, 792) form a triangle whose side (87) connecting joints (782 and 792), and side (88) connecting joints (212 and 782), has a fixed length. Side (89) connecting joints (212 and 792), on the other hand, has a variable length. Joint (792) is arranged on mowing group (220) so that when the latter is pivoted into its transport position, the length of side (89) connecting joints (212 and 792) decreases. Since the two other sides (87 and 88) of the triangle have fixed lengths, this produces a decrease of the angle between these two sides (87 and 88) and consequently by a deformation of deformable quadrilateral (222) in a direction such that mowing group (220) draws near to the median vertical plane of the tractor.

Joints (781, 791; 782, 792) are all, like joints (78, 79) of the preceding example, spherical joints. In the invention, these joints, however, could be of another type such as, for example, universal joints of cardan type.

Various modifications can be provided to the embodiments described without thereby going outside the scope of this invention as defined in the claims.

What is claimed as new and desired to be secured by Letters Patent of the United States is:

1. A mower to be connected to a tractor having a median vertical plane extending at least approximately in a direction of advance at work, said mower comprising:

a frame connectable to a tractor;
a mowing group connected to said frame by a pivot joint having an axis extending at least approximately parallel to said direction of advance at work, said pivot joint enabling said moving group to be positioned in a working position laterally of the tractor and to be pivoted to an upwardly directed transport position; and a maneuvering element for pivoting said mowing group at least from said working position to said transport position;

wherein said frame comprises a deformable quadrilateral permitting said mowing group to move towards said median vertical plane for transport and permitting said mowing group to move away from said median vertical plane for working, said deformable quadrilateral including:

(a) a hitching element constituting one leg of said quadrilateral, said hitching element comprising means for connecting said frame to the tractor, (b) a support beam constituting another leg of said quadrilateral, said mowing group being pivotally connected to said support beam by said pivot joint, (c) a first connection element pivotally connected between said hitching element and said support beam by pivot joints having upwardly directed axes, said first connection element constituting another leg of said quadrilateral, (d) a second connection element pivotally connected between said hitching element and said support beam by pivot joints having upwardly directed axes, said second connection element constituting another leg of said quadrilateral, and (e) a control means acting on said deformable quadrilateral and cooperating with said maneuvering element for deforming said quadrilateral such that said mowing group moves towards said median vertical plane simultaneously with the pivoting of said mowing group from said working position to said transport position about said pivot joint pivotally connecting said mowing group to said support beam, and said mowing group moves away from said median vertical plane simultaneously with the pivoting of said mowing group from said transport position to said working position about said pivot joint.

2. The mower of claim 1, wherein said axes of said pivot joints pivotally connecting said first connection element between said hitching element and said supporting beam and said axes of said pivot joints pivotally connecting said second connection element between said hitching element and said support beam are at least approximately parallel.

3. The mower of claim 1 wherein the connection elements are when said mowing group is in said working position, inclined in the direction of the side where the mowing group extends.

4. The mower of claim 1 wherein said quadrilateral is deformable in an at least approximately horizontal plane.

5. The mower of claim 1 wherein said first connection element comprises a link and wherein said second connection element comprises means for supporting said support beam.

6. The mower of claim 5 wherein said pivot joint connecting said second connection element to said support beam further includes a pivot axis extending at least approximately parallel to said direction of advance at work, and wherein said pivot joints pivotally connecting said first connection element between said hitching element and said support beam are spherical joints, whereby said support beam can move upwardly and downwardly to allow said moving group to follow ground contours during working.

7. The mower of claim 1 wherein said pivot joint for said mowing group is located at an end of said support beam and said second connection element is connected to another end of said support beam, and wherein said first connection element is connected to said support beam between said ends of said support beam.

8. The mower of claim 7 wherein said first connection element is longer than said second connection element and is inclined toward said mowing group when said mowing group is in said working position.

9. The mower of claim 7 wherein said first connection element comprises a safety tie rod having means for increasing the length of said tie rod in response to an axial pull thereon.

10. The mower of claim 1 wherein said control means comprises a fixed length control element pivotally connected between said hitching element and said mowing group, by pivot joints, whereby said pivot joint pivotally connecting said control element to said mowing group extends relative to said pivot joint pivotally connecting said mowing group to said support beam in such a manner that said mowing group pulls on said control element during pivoting of said mowing group to said transport position.

11. The mower of claim 10 wherein said pivot joints pivotally connecting said control element between said hitching element and said mowing group extend, when said mowing group is in said working position at least approximately the same distance from the ground onto which said mowing group rests during working.

12. The mower of claim 10 wherein said pivot joints pivotally connecting said control element between said hitching element and said mowing group are spherical joints.

13. The mower of claim 1 wherein:
a pivoting element is pivotally connected between said hitching element and said support beam by pivot joints;
said control means comprises a fixed length control element pivotally connected between said pivoting element and said mowing group by pivot joints;
said pivot joint pivotally connecting said control element to said pivoting element extends between said pivot joints pivotally connecting said pivoting element to said hitching element and said support beam; and
said pivot joint pivotally connecting said control element to said mowing group extends relative to said pivot joint pivotally connecting said mowing group to said support beam in such a manner that a distance separating said pivot joint pivotally connecting said control element to said mowing group and said pivot joint pivotally connecting said pivoting element to said support beam increases during pivoting of said mowing group to said transport position.

14. The mower of claim 13 wherein said pivoting element is constituted by one of said connection element.

15. The mower of claim 14 wherein said pivoting element is constituted by said one of said connection elements farthest from said mowing group.

16. The mower of claim 13 wherein said pivot joints pivotally connecting said control element between said pivoting element and said mowing group extend, when said mowing group is in said working position, at least approximately the same distance from the ground onto which said mowing group rests during working.

17. The mower of claim 13 wherein said pivot joints pivotally connecting said control element between said pivoting element and said mowing group are spherical joints.

18. The mower of claim 13 wherein said pivot joints pivotally connecting said pivoting element between said hitching element and said support beam have axes which are at least approximately parallel to said axes of said pivot joints pivotally connecting said first and second connection elements between said hitching element and said support beam.

19. The mower of claim 1 wherein:
   a pivoting element is pivotally connected between said hitching element and said support beam by pivot joints;
   said control means comprises a fixed length control element pivotally connected between said pivoting element and said mowing group by pivot joints;
   said pivot joint pivotally connecting said control element to said pivoting element extends beyond said pivot joints pivotally connecting said pivoting element to said hitching element and said support beam; and
   said pivot joint pivotally connecting said control element to said mowing group extends relative to said pivot joint pivotally connecting said mowing group to said support beam in such a manner that a distance separating said pivot joint pivotally connecting said control element to said mowing group and said pivot joint pivotally connecting said pivoting element to said support beam decreases during pivoting of said mowing group to said transport position.

20. The mower of claim 19 wherein said pivoting element is constituted by one of said connection elements.

21. The mower of claim 20 wherein said pivoting element is constituted by said one of said connection elements farthest from said mowing group.

22. The mower of claim 19 wherein said pivot joints pivotally connecting said control element between said pivoting element and said mowing group extend, when said mowing group is in said working position, at least approximately the same distance from the ground onto which said mowing group rests during working.

23. The mower of claim 19, wherein said pivot joints pivotally connecting said control element between said pivoting element and said mowing group are spherical joints.

24. The mower of claim 19 wherein said pivot joints pivotally connecting said pivoting element between said hitching element and said support beam have axes which are at least approximately parallel to said axes of said pivot joints pivotally connecting said first and second connection elements between said hitching element and said support beam.

25. The mower of claim 1 wherein said maneuvering element is pivotally connected between said frame and said mowing group by pivot joints.

26. The mower of claim 25 wherein said manoeuvring element is directly or indirectly pivotally connected to one of said connection elements.

27. The mower of claim 26 wherein said manoeuvring element is directly or indirectly pivotally connected to said one of said connection elements farthest from said mowing group.

28. The mower of claim 27 wherein said maneuvering element is directly or indirectly pivotally connected to said one of said connection elements farthest from said mowing group in the vicinity of said pivot joint pivotally connecting said one connection element to said support beam.

29. The mower of claim 25 wherein said maneuvering element comprises hydraulic cylinder.

30. The mower of claim 1 including lightenig means for upwardly biasing said mowing group.

31. The mower of claim 30 wherein said lightening means is directly or indirectly pivotally connected to one of said connection elements.

32. The mower of claim 31 wherein said lightening means is directly or indirectly pivotally connected to said one of said connection elements farthest from said mowing group.

33. The mower of claim 32 wherein said lightening means is directly or indirectly pivotally connected to said one of said connection elements farthest from said mowing group in the vicinity of said pivot joint pivotally connecting said one connection element to said support beam.

34. The mower of claim 30 wherein said lightening means comprises at least one draw spring.

35. The mower of claim 1 including power transmission means for transmitting rotational power from the tractor to said mowing group, said transmission means including a transmission element having means directly connectable to a power takeoff of the tractor, said transmission element being connected to said support beam at a position such that said transmission element is out of alignment with said medium vertical plane in a direction to said mowing group when said mowing group is in said working position.

36. The mower according to claim 1 wherein said mowing group comprises:
   a plurality of cutting elements;
   a rotary drum positioned above at least one of said cutting elements closest to said pivot joint of said mowing group; and
   drive means extending at least partially through said drum.

37. The mower according to claim 36 including a transmission housing extending above said drum and incorporating said pivot joint of said mowing group.

38. A mower to be connected to a tractor having a median vertical plane extending at least approximately in a direction of advance at work, said mower comprising:
   a frame connectable to a tractor;
   a mowing group connected to said frame by a pivot joint which enables said mowing group to be positioned in a working position laterally of the tractor and to be pivoted to an upwardly directed transport position; and
   a maneuvering element for pivoting said mowing group at least from said working position to said transport position;
   wherein said frame comprises a deformable quadrilateral permitting said mowing group to move towards said median vertical plane for transport and permitting said mowing group to move away from said median vertical plane for working, said deformable quadrilateral including:

(a) a hitching element constituting one leg of said quadrilateral, said hitching element comprising means for connecting said frame to the tractor, (b) a support beam constituting another leg of said quadrilateral, said mowing group being pivotally connected to said support beam by said pivot joint, (c) a first connection element pivotally connected between said hitching element and said support beam by pivot joints, said first connection element constituting another leg of said quadrilateral, (d) a second connection element pivotally connected between said hitching element and said support beam by pivot joints, said second connection element constituting another leg of said quadrilateral, and (e) a control means acting on said deformable quadrilateral and cooperating with said maneuvering element for deforming said quadrilateral such that said mowing group moves towards said median vertical plane simultaneously with the pivoting of said mowing group from said working position to said transport position about said pivot joint pivotally connecting said mowing group to said support beam, and said mowing group moves away from said median vertical plane simultaneously with the pivoting of said mowing group from said transport position to said working position about said pivot joint.

* * * * *